United States Patent
Marx et al.

(10) Patent No.: US 9,616,732 B2
(45) Date of Patent: Apr. 11, 2017

(54) AIR OUTLET FOR VENTILATING THE INTERIOR OF A MOTOR VEHICLE

(75) Inventors: Guenther Marx, Armsheim (DE);
Guenter Boersch, Halsenback (DE);
Helmut Nitzsche, Ober-Hilbersheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1311 days.

(21) Appl. No.: 13/469,415

(22) Filed: May 11, 2012

(65) Prior Publication Data

US 2012/0289140 A1   Nov. 15, 2012

(30) Foreign Application Priority Data

May 14, 2011   (DE) .......................... 10 2011 101 612

(51) Int. Cl.
*B60H 1/24* (2006.01)
*B60H 1/28* (2006.01)

(52) U.S. Cl.
CPC ..................... *B60H 1/28* (2013.01)

(58) Field of Classification Search
CPC ... B60H 1/24; B60H 1/28; B60H 1/34; B60H 2001/3492
USPC ............. 454/143, 146, 152, 155, 162, 156; 296/192, 194
See application file for complete search history.

(56) References Cited

U.S. PATENT DOCUMENTS

| | | | |
|---|---|---|---|
| 5,854,452 A | 12/1998 | Campbell et al. | |
| 6,648,749 B2* | 11/2003 | Hayashi | B60H 1/249 454/162 |
| 7,562,912 B2* | 7/2009 | Saenz | F16L 25/0009 285/345 |
| 2007/0087680 A1 | 4/2007 | Kim | |

FOREIGN PATENT DOCUMENTS

| | | | | |
|---|---|---|---|---|
| DE | 19705683 A1 | | 8/1998 | |
| DE | 19737788 C1 | | 3/1999 | |
| DE | 19940286 A1 | | 4/2001 | |
| DE | 20104251 U1 | | 6/2001 | |
| DE | 10340084 A1 | * | 3/2005 | ............... B60H 1/00 |
| DE | 602005002825 T2 | * | 7/2008 | |
| DE | 102007015110 A1 | * | 10/2008 | |
| DE | 102007059763 A1 | | 6/2009 | |
| EP | 1775200 A2 | | 4/2007 | |
| GB | 2448049 A | | 10/2008 | |

(Continued)

OTHER PUBLICATIONS

German Patent Office, German Search Report dated Jan. 12, 2012 for Application No. 102011101612.4.

(Continued)

*Primary Examiner* — Gregory Huson
*Assistant Examiner* — Dana Tighe
(74) *Attorney, Agent, or Firm* — Lorenz & Kopf, LLP.

(57) ABSTRACT

An air outlet for ventilating the interior of a motor vehicle is provided. The air outlet is fluidly connected with a module of a heating, ventilating and/or air conditioning system. The air outlet includes a linkage region having an opening. An insulating structure is held in the linkage region with the air outlet in a fluidically-connected state. A retainer is configured to fix the insulating structure on the air outlet in the linkage region.

15 Claims, 5 Drawing Sheets

(56) References Cited

FOREIGN PATENT DOCUMENTS

| | | |
|---|---|---|
| JP | 2003165329 A | 6/2003 |
| JP | 2005212712 A | 8/2005 |
| JP | 2007055461 A | 3/2007 |
| WO | 2010017254 A2 | 2/2010 |

OTHER PUBLICATIONS

China Patent Office, China Office Action for China Application No. 2015040201058940, dated Apr. 8, 2015.

* cited by examiner

AIR OUTLET FOR VENTILATING THE INTERIOR OF A MOTOR VEHICLE

CROSS-REFERENCE TO RELATED APPLICATION

This application claims priority to German Patent Application No. 10 2011 101 612.4 filed May 14, 2011, which is incorporated herein by reference in its entirety.

TECHNICAL FIELD

The technical field generally relates to an air outlet for ventilating the interior of a motor vehicle, wherein the air outlet can be connected in terms of flow with a module of the heating, ventilating and/or air conditioning system in a linkage region by way of at least one opening, and an insulating structure is held in the linkage region with the air outlet in a fluidically-connected state

BACKGROUND

An air outlet typically is situated on a wall separating the interior from the engine compartment of a motor vehicle, e.g., the vehicle bulkhead, in order to establish an air passage from the engine compartment into the interior for ventilating the interior of the motor vehicle. As a result, fresh outside air can flow into the air outlet from outside via the engine compartment and a through opening in the wall, and from there make its way into the heating, ventilating and/or air conditioning system of the motor vehicle. To this end, the air outlet is usually connected in terms of flow with a module of the heating, ventilating and/or air conditioning system by way of an opening.

The air outlet, bulkhead of the motor vehicle and at least parts of the heating, ventilating and/or air conditioning system are usually insulated from the interior of the motor vehicle in terms of heat or sound. In order to achieve the best possible insulation, care is taken to have the insulating structure encompass the components to be insulated as completely as possible. This is why the insulating structure usually also extends in the region between the air outlet and module of the heating, ventilating or air-conditioning system connected thereto.

During the course of assembling the components in the interior of the motor vehicle, it has been found that the insulating structure often becomes corrugated against the module in the linkage region of the air outlet, since the insulating structure is usually cut to size based on low tolerance requirements. The corrugation of the insulating structure makes fixing the latter in place in the region between the air outlet and module to be connected thereto a relatively complicated and time-consuming process. As a whole, this makes it significantly harder to assemble the module on the air outlet.

Therefore, it is desirable to provide an air outlet that ventilates the interior of a motor vehicle and that enables integration into the ventilating system of the motor vehicle in terms of fluid mechanics through simple and quick assembly, even despite the insulating structure. It is also desirable to provide a motor vehicle that incorporates such an air outlet. Furthermore, other desirable features and characteristics will become apparent from the subsequent detailed description and the appended claims, taken in conjunction with the accompanying drawings and this background.

SUMMARY

In an exemplary embodiment, an air outlet for ventilating the interior of a motor vehicle can be connected in terms of flow with a module of a heating, ventilating and/or air conditioning system in a linkage region by an opening, wherein an insulating structure is held in the linkage region with the air outlet in a fluidically-connected state. To this end, the insulating structure can be positively and/or non-positively held in the linkage region, in particular in the region between the air outlet and the module of the heating, ventilating and/or air conditioning system. The insulating structure is held in the linkage region in a positive and/or non-positive manner.

In an embodiment, a retainer can be used to fix the insulating structure in place on the air outlet in the linkage region. This measure makes it easier to link the air outlet to a component of the heating, ventilating and/or air conditioning system of the motor vehicle in terms of fluid mechanics because the insulating structure already is fixed in place on the air outlet before the air outlet is linked in terms of fluid mechanics.

Even if the insulating structure is cut to size based on a larger tolerance, and thus exhibits a corrugated shape in the linkage region, a quick and easy assembly is still possible. This is because the retainer fixes the corrugated insulating structure in a defined position on the air outlet already before the air outlet is linked in terms of fluid mechanics to the component of the heating, ventilating or air conditioning system of the motor vehicle, so that the area of contact between the air outlet and component of the heating, ventilating and air conditioning system, in particular a flange region, is free of the insulating structure. The component of the heating, ventilating or air conditioning system can hence be connected in terms of fluid mechanics with the opening of the air outlet without having to move the insulating structure out of the area of the opening beforehand for this purpose. As a consequence, it is easier to link the air outlet to a component or module of the system in terms of fluid mechanics, since the insulating structure is not additionally manually held in place during assembly.

In addition, it is possible to meet time constraints for assembling the air outlet especially well, since assembly steps that are difficult to calculate in terms of time result in a loose and corrugated insulating structure projecting into the linkage region. By fixing the insulating structure in place on the air outlet in the linkage region in advance, the air outlet can as a result be more quickly assembled with a component of the ventilating system of the motor vehicle by way of its at least one opening than previously the case.

It would make sense for the retainer to act in such a way as to fix the insulating structure in place on the opening and/or the boundary of the opening of the air outlet. This avoids losses in heat and/or sound insulation, since the insulating structure exerts an insulating effect until close to the opening of the air outlet.

In one embodiment, at least one section of the retainer is inserted, in particular plugged, into the opening of the air outlet. As a result, the retainer can be mounted through simple insertion or plugging into the opening of the retainer.

Optimal heat/sound insulation can be achieved with the insulating structure if the insulating structure exhibits an opening that essentially corresponds with the opening of the air inlet. The retainer can be used to fix the insulating structure in place on the air inlet in the region of its opening or opening boundary so that it does not disrupt the process of linking the air outlet in terms of fluidic mechanics to a module of the heating, ventilating or air conditioning system of the motor vehicle.

In another embodiment, the retainer configured like a kind of connecting element, which can be non-positively and/or positively introduced into the air outlet with the interspersion of the insulating structure. For example, such a connecting element can be a screw element, a welding nipple, a welding nut, a setscrew or the like.

If at least one section of the retainer can be introduced into the opening of the air outlet, it makes sense that the section forms a circumferential contour that essentially corresponds with the inner circumference of the opening of the air outlet. As a result, the retainer is already held in a positioned location in the opening of the air outlet, in particular positively in a positioned location by the wall forming the inner circumference of the opening. As a consequence, a lateral motion by the retainer in the opening of the air outlet can be preset depending on the type of dimensions of the introducible section. For example, the section can exhibit a circumferential contour, which establishes a connection relative to the inner circumference of the opening in terms of clearance, so that the retainer can be laterally moved in the opening of the air outlet within certain limits. The circumferential contour formed by the introducible section can also be dimensioned in such a way that the retainer establishes a crimped connection on the opening or inner circumference of the opening, so that a certain level of force is expended to introduce the section into the opening, and the introducible section is tightly held against the inner circumference of the opening.

In another embodiment, the retainer exhibits one or more material sections, which positively and/or non-positively secures the retainer to the air outlet so that it cannot detach when in the assembled state. If a retainer has been inserted into the opening of the air outlet, this prevents the retainer from being removed from the opening.

The material section acts against the inner circumference and/or boundary of the opening of the air outlet with the retainer in the integrated state. In this way, it is especially easy to realize a safeguard against the retainer detaching from the air outlet. For example, the material section can be a latch and/or clip element, and the boundary or inner circumference of the opening can serve as an abutment for the latch or clip element. In an embodiment, the material section configured as a clamping section, which becomes actively positioned against the boundary or inner circumference of the opening as a counter-clamping surface.

In another embodiment, the retainer has a section that forms an abutting face for the module of the heating, ventilating and/or air conditioning system that can be fluidically connected with the air outlet. As a result, the retainer itself uses the abutment face to form a flange for linking a component or module of the heating, ventilating and/or air conditioning system of the motor vehicle. A defined surface is thus generated, on which the component or module can be fluidically connected with the air outlet.

In an embodiment, the abutment face is essentially flat in design. This essentially flat surface makes it possible to link the module or component of the heating, ventilating or air conditioning system in terms of fluid mechanics essentially without any leakage.

The abutment face is configured to accommodate a seal in an embodiment. The seal represents another measure for avoiding any fluid leakage in the linkage region between the air outlet and the module or component of the heating, ventilating or air conditioning system of the motor vehicle.

If the abutment face is essentially flat, the seal is configured like a strip seal, which is especially cost-effective.

In another embodiment, the section around the opening of the air outlet is continuous in design. This measure is also geared toward realizing the tightest possible fluidic connection between the air outlet and retainer and module of the heating, ventilating and/or air conditioning system of the motor vehicle to be linked thereto.

In a further embodiment, the retainer is configured such that the insulating structure lies between the boundary region of the opening and the section with the retainer in the integrated state. This imparts a dual effect to the section. On the one hand, the section of the retainer forms a flange to link a component of the heating, ventilating or air conditioning system of the motor vehicle in terms of fluid mechanics. On the other hand, the inside of the section serves as an abutment face for the insulating structure, for example which abuts the boundary of the opening of the air outlet on the one hand, and is secured against moving away from the boundary of the opening by the section of the retainer on the other. If the insulating structure exhibits an opening whose circumference essentially corresponds with the opening of the air outlet or the opening of the retainer, an especially good fixation of the insulating structure is achieved in this way by the retainer on the boundary of the opening of the air outlet.

At least the section exhibiting the abutment face is molded onto the section of the air outlet introducible into the opening, in accordance with an embodiment. This makes it easy to manufacture the retainer sections.

The retainer can be configured as a single piece. As a result, the retainer can be easily fabricated. In an embodiment, the retainer is a plastic part. For example, the retainer can be molded out of a part, e.g., an injection molded part. This makes it easy and cost-effective to realize the retainer.

Another embodiment provides that the retainer is configured as a frame that envelops the opening of the air outlet and covers the boundary of the opening, such as, for example, a casement or enclosure. In another embodiment, a frame is the retainer of an air outlet of the kind described above.

A motor vehicle with a heating, ventilating and/or air conditioning system and an air outlet of the kind described above is also contemplated herein. In an embodiment, the air outlet is fluidically connected with a module of the heating, ventilating and/or air conditioning system, wherein the retainer of the air outlet holds an insulating structure of the motor vehicle on the air outlet in the region between the air outlet and module. The air outlet is arranged between the module and bulkhead of the motor vehicle, and the air outlet is in conjunction with an opening in the bulkhead to form an air passage from outside into the module.

In an embodiment, a heat and/or sound-insulating structure that at least partially covers the heating, ventilating and/or air conditioning system of the motor vehicle is fixed directly to the opening of the air outlet, by means of which the air outlet is connected with the module of the heating/ventilating/air conditioning system. As a result, the insulating structure is already correspondingly aligned or positioned on the air outlet even before the air outlet is assembled, thereby making it easier to link the air outlet in terms of fluid mechanics to a component of the ventilating system or the heating/ventilating/air conditioning system of the motor vehicle. In addition, the air outlet can be assembled in a shorter period of time as a result. The insulating structure can be present within a large tolerance, and hence be corrugated as it rests against the opening of the air outlet. Because the retainer is designed as a frame, one section of the frame smoothes out the corrugation of the insulating structure in the region of the boundary of the opening.

An optimal heat/sound insulation at the air outlet is realized by the insulating structure. A defined linkage or coupling surface to which a module of the heating, ventilating or air conditioning system can be linked is also manufacturable.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
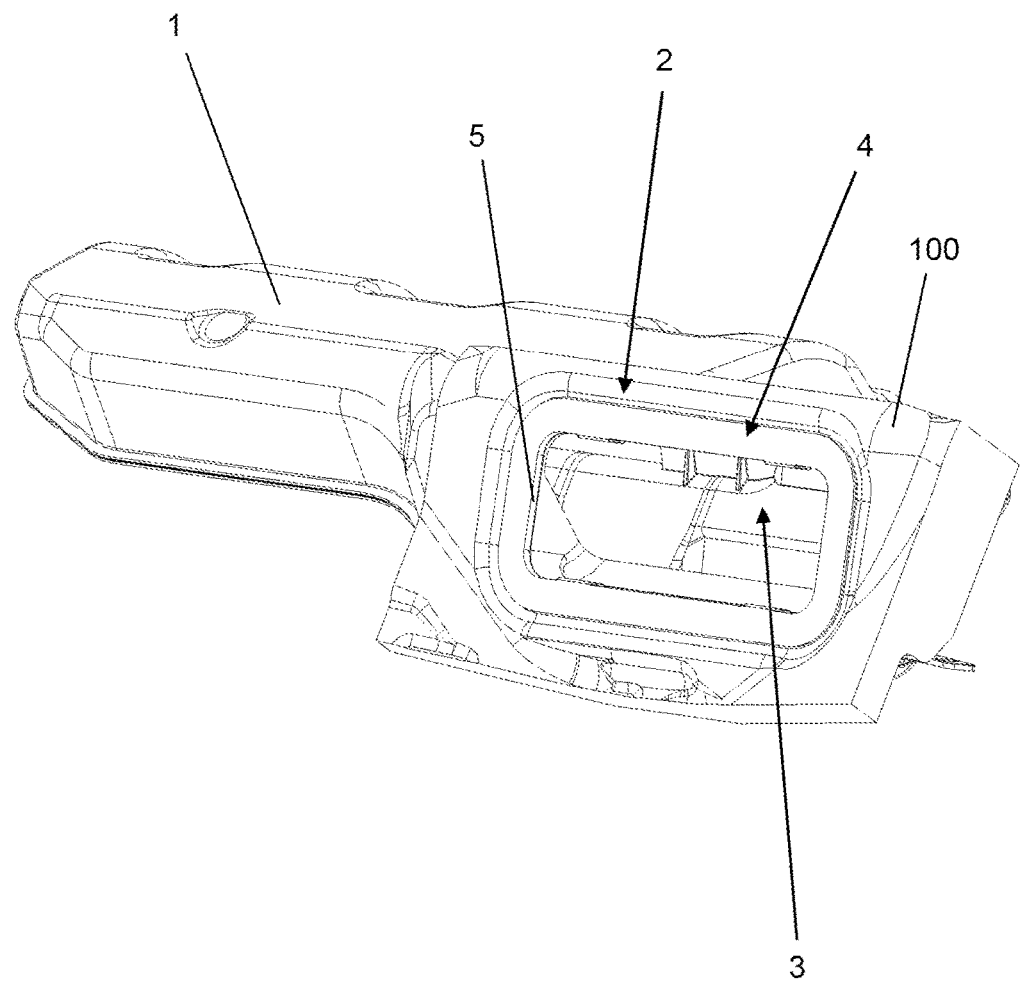
FIG. 1 is a perspective view of an air outlet for ventilating the interior of a motor vehicle, with a retainer for fixing an insulating structure in place on the air outlet, in accordance with an exemplary embodiment.
Figure 2:
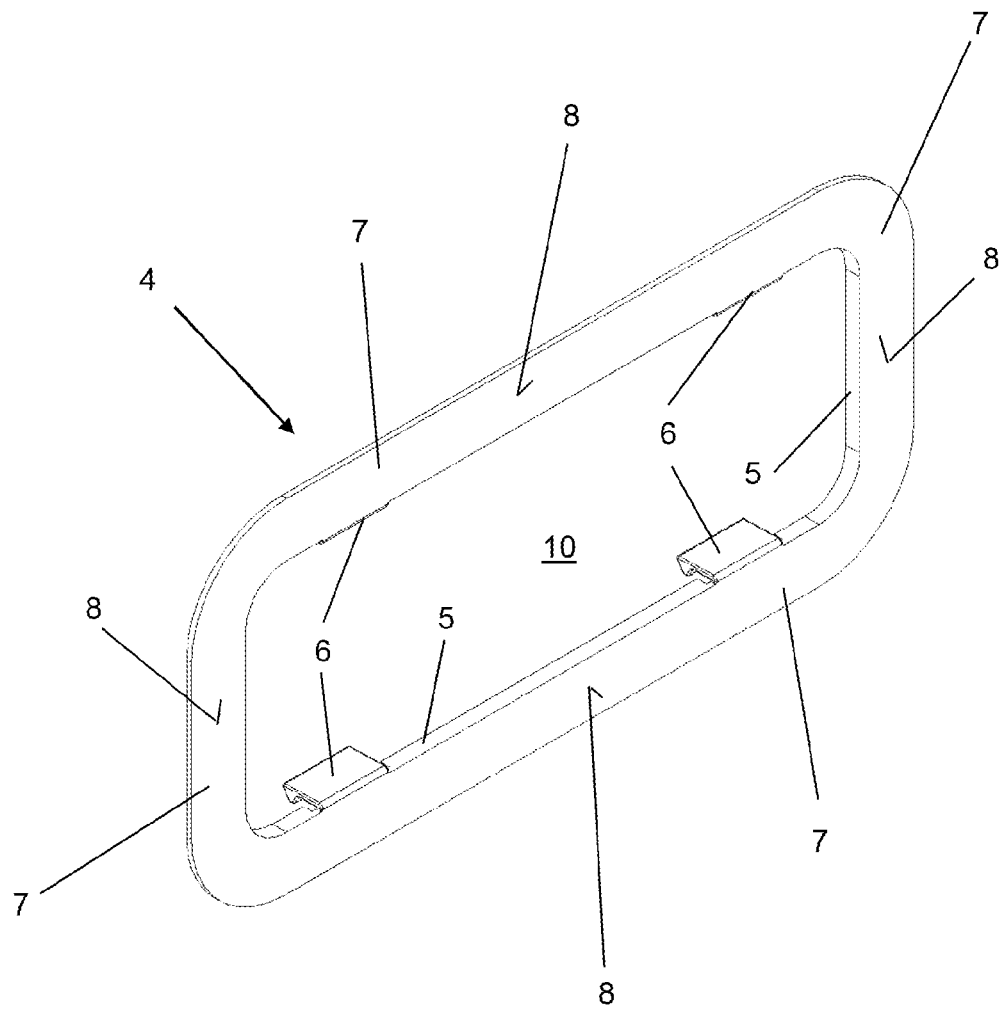
FIG. 2 is a perspective view of the retainer of the air outlet according to FIG. 1.
Figure 3:
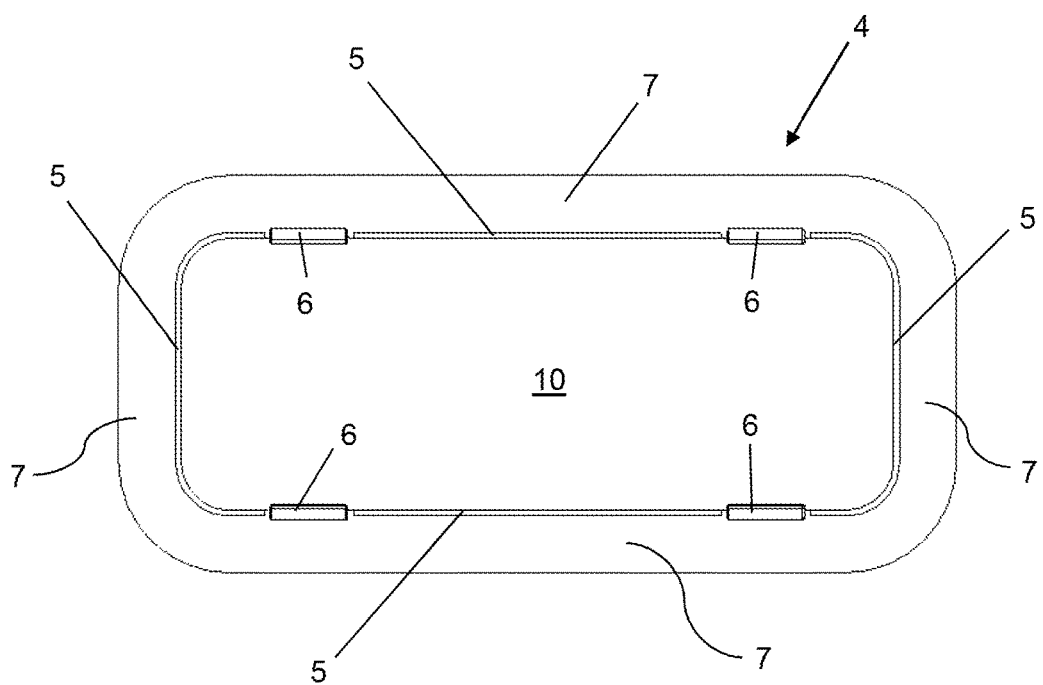
FIGS. 3 to 5 show a top view and two different side views of the retainer of the air outlet according to FIG. 1.
Figure 4:
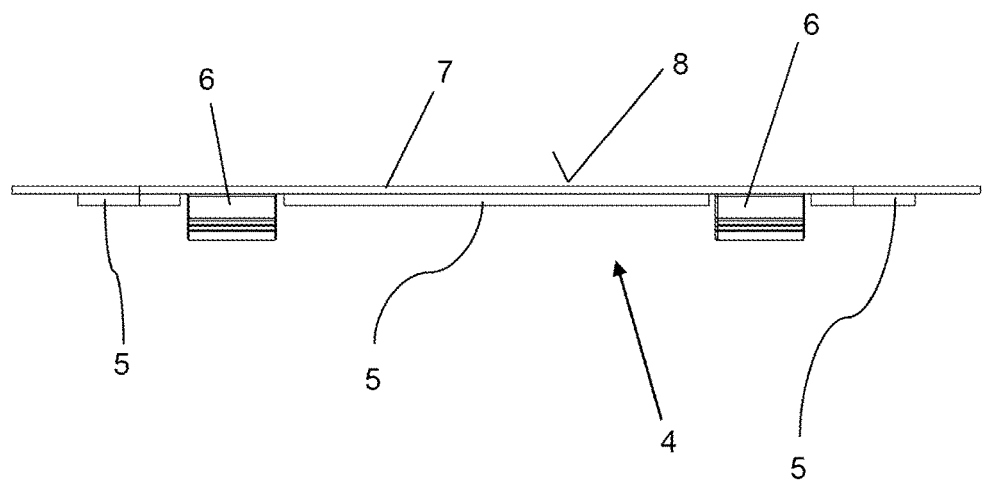
Figure 5:
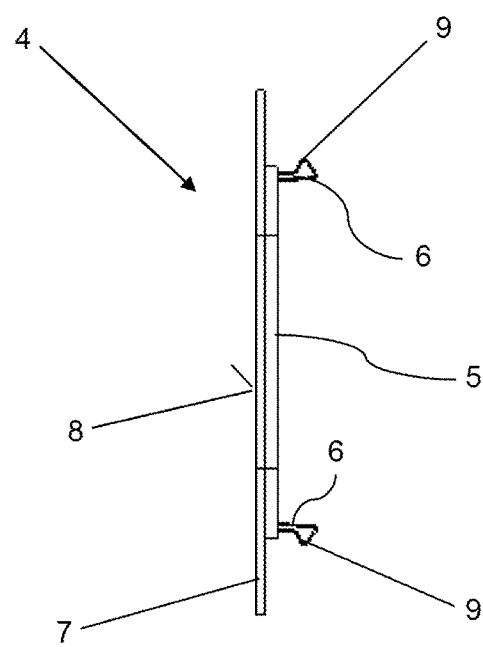

FIG. 1 shows an air outlet 1 that is used for ventilating the interior of a motor vehicle, in accordance with an exemplary embodiment. For example, the air outlet 1 can be arranged on the bulkhead of the motor vehicle on an interior side and, together with a through opening in the bulkhead, form an air channel toward a component of the ventilating system of the motor vehicle. FIG. 1 depicts an opening 3 in the air outlet 1, out of which can flow outside air, for example. In order to link a component of the ventilating system of the vehicle, in particular a module of the heating, ventilating and/or air conditioning system of the motor vehicle, the air outlet 1 exhibits a linkage region 2. The component or module can be connected thereto in terms of fluid mechanics by way of the opening 3.

As further evident, an insulating structure 100 exhibits heat and/or sound insulating properties, for example, so as to minimize sound transmission in the vicinity of the air outlet. The insulating structure 100 can be configured as a blanket insulator, for example, and preferably abuts the air outlet 1, preferably also extending over additional components of the ventilation system of the motor vehicle, in particular over the module of the heating, ventilating and/or air conditioning system that can be linked to the opening 3 in terms of fluid mechanics.

In an embodiment, the insulating structure 100 has a through opening that essentially corresponds to the dimensions of the opening 3 of the air outlet 1 so that the opening of the insulating structure 100 abuts the boundary of the opening 3 of the air outlet 1, but does not project into the opening 3 of the air outlet 1.

In another embodiment, a retainer 4 is provided so the insulating structure 100 can be fixed in place on the air outlet 1 in the linkage region 2. To this end, the retainer 4 includes a section 5, which can be introduced into the opening 3 of the air outlet 1. As particularly evident from FIGS. 2 to 5, the section 5 is continuous such that the section 5 forms a through opening 10 of the retainer 4. The through opening 10 of the retainer 4 preferably exhibits a circumferential contour that substantially corresponds with the inner circumference of the opening 3 of the air outlet 1.

The retainer 4 further has one, preferably several, for example, four sections 6 that positively secure the retainer 4 against detachment on the air outlet 1 in the mounted state. The material sections 6 are arranged in the area of the inner circumference of the through opening 10 of the retainer 4. For example, the material sections are molded onto the retainer 4. In an embodiment, the continuous section 5 with which the retainer 4 can be introduced into the opening 3 of the air outlet 1 is interrupted in the area of the material sections 6 so that the respective material sections 6 can project into the opening 3 of the air outlet 1 instead of the section 5. The material sections 6 exhibit a latch/clip section 9 that, with the retainer 4 mounted on the air outlet 1, becomes actively positioned at the boundary or inner circumference of the opening 3 of the air outlet 1. In this respect, the boundary or inner circumference of the opening 3 acts as an abutment for the latch or clip section 9.

As evident from FIGS. 2 to 5, the retainer 4 exhibits a section 7 that forms an abutment face 8, in accordance with another embodiment. A component or module of the heating, ventilating and/or air conditioning system of the motor vehicle can be linked to the abutment face 8 in terms of fluid mechanics, in particular made to abut the abutment face 8. The abutment face 8 is preferably at least substantially flat, so that the abutment face 8 generates a high sealing action. The abutment face 8 also provides the opportunity to apply a sealing element thereupon (not shown in the figures), which preferably abuts flatly against the abutment face 8 in the form of strips.

Figure 6:
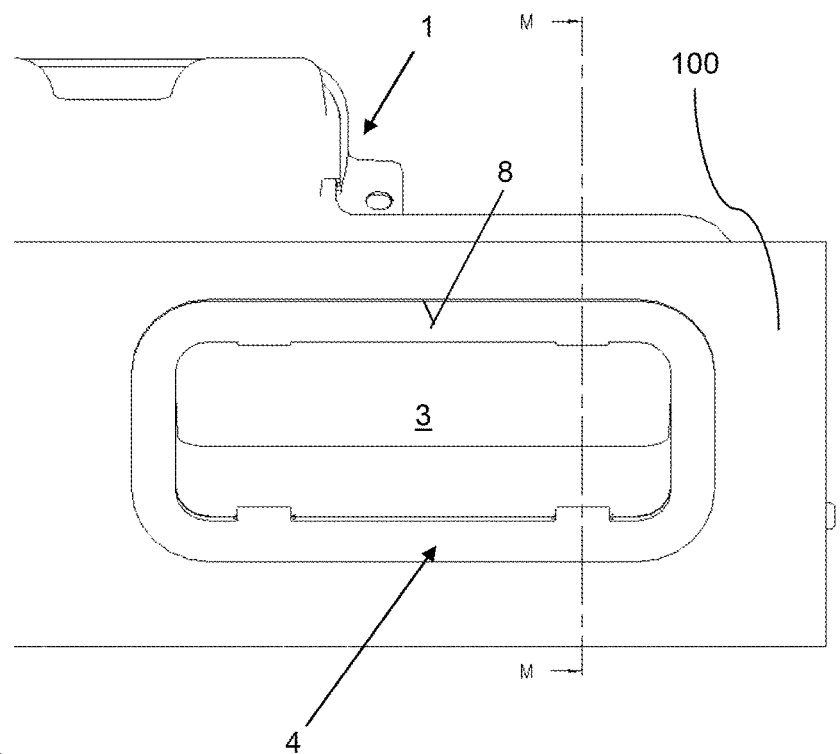
FIG. 6 is a perspective view of a section of the air outlet according to FIG. 1 with its retainer.
Figure 7:
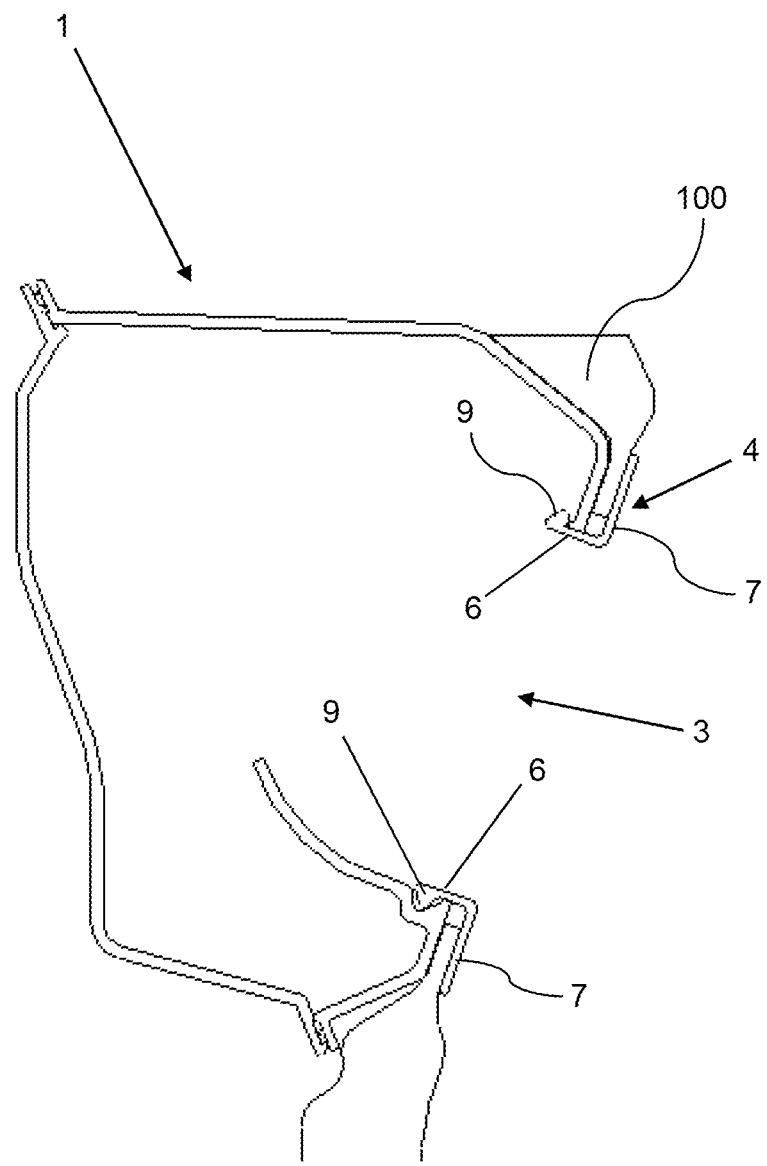
FIG. 7 is the air outlet according to FIG. 1 in a sectional view along sectional line M-M according to FIG. 6.

As evident in particular from FIG. 6 in conjunction with the sectional view of FIG. 7, the insulating structure 100 is held between the inner wall of the section 7 and boundary of the opening 3 of the air outlet 1 with the retainer 4 in an integrated state on the air outlet 1.

The section 5 projecting into the opening 3 of the air outlet 1 essentially over the entire circumference prevents the insulating structure 100 from sliding into the region of the opening 3 of the air outlet 1. As a result of the retainer 4, the insulating structure 100 becomes positively fixed in place in the region of the boundary of the opening 3 of the air outlet 1, so that the insulating structure does not disruptively project into the region of the opening 3 of the air outlet 1 while mounting a module of the heating, ventilating and/or air conditioning system to the air outlet 1.

As evident in particular from FIGS. 2 to 5, in an embodiment, the retainer 4 is preferably designed as a frame, which envelops the opening 3 of the air outlet 1 and covers the boundary of the opening 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An air outlet for ventilating the interior of a motor vehicle, wherein the air outlet is fluidly connected with a module of a heating, ventilating and/or air conditioning system, the air outlet comprising:
   a linkage region having an opening, wherein an insulating structure is held in the linkage region with the air outlet in a fluidically-connected state; and
   a retainer configured to fix the insulating structure on the air outlet in the linkage region, wherein the retainer comprises an abutment face for the module of the heating, ventilating and/or air conditioning system that can be fluidically connected with the air outlet, and wherein the retainer comprises a section that is inserted and plugged into the opening of the air outlet, and
   wherein the insulating structure is held between a boundary area of the opening and the abutment face such that the insulating structure does not project into the opening.

2. The air outlet according to claim 1, wherein the retainer is configured to fix the insulating structure on the air outlet at the opening.

3. The air outlet according to claim 2, wherein the retainer is configured to fix the insulating structure on the air outlet at a boundary of the opening of the air outlet.

4. The air outlet according to claim 1, wherein the section is continuous.

5. The air outlet according to claim 1, wherein the retainer comprises a material section that positively or non-positively secures the retainer to the air outlet.

6. The air outlet according to claim 5, wherein the material section acts against an inner circumference and/or boundary of the opening of the air outlet with the retainer in an integrated state.

7. The air outlet according to claim 1, wherein the abutment face is at least substantially flat.

8. The air outlet according to claim 1, wherein the abutment face accommodates a seal.

9. The air outlet according to claim 1, wherein the retainer is a single piece.

10. The air outlet according to claim 9, wherein the retainer is a plastic part.

11. The air outlet according to claim 1, wherein the retainer is a frame configured to laterally envelop the opening of the air outlet and at least partially cover a boundary of the opening, and prevent the insulating structure from sliding over the opening.

12. A frame for an air outlet for ventilating the interior of a motor vehicle, wherein the air outlet has an opening with a boundary and is fluidly connected with a module of a heating, ventilating and/or air conditioning system, the frame comprising:
   a first section that is inserted into the opening of the air outlet;
   a material section connected to the first section and that positively or non-positively secures the frame to the air outlet; and
   an abutment face connected to the first section, wherein an insulating structure is held between the boundary of the opening and the abutment face such that the insulating structure does not project into the opening, and
   wherein the frame is configured to laterally envelop the opening of the air outlet and at least partially cover the boundary of the opening, and prevent the insulating structure from sliding over the opening.

13. A motor vehicle with a heating, ventilating and/or air conditioning system and an air outlet, wherein the air outlet is fluidly connected with a module of the heating, ventilating and/or air conditioning system, the air outlet comprising:
   a linkage region having an opening, wherein an insulating structure is held in the linkage region with the air outlet in a fluidically-connected state; and
   a retainer configured to fix the insulating structure on the air outlet in the linkage region such that the insulating structure does not project into the opening, and
   wherein the retainer comprises a section that is inserted into the opening of the air outlet, and wherein the section forms a circumferential contour that substantially corresponds with an inner circumference of the opening of the air outlet.

14. The motor vehicle according to claim 13, wherein the retainer comprises a section that is inserted into the opening of the air outlet.

15. The motor vehicle according to claim 14, wherein the retainer further comprises an abutment face connected to the section and wherein the insulating structure lies between a boundary of the opening and the abutment face.

* * * * *